(12) United States Patent
Lee et al.

(10) Patent No.: US 12,249,728 B2
(45) Date of Patent: Mar. 11, 2025

(54) BATTERY MODULE AND BATTERY PACK INCLUDING THE SAME

(71) Applicant: LG ENERGY SOLUTION, LTD., Seoul (KR)

(72) Inventors: Youngho Lee, Daejeon (KR); Junyeob Seong, Daejeon (KR); Jongha Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 604 days.

(21) Appl. No.: 17/437,757

(22) PCT Filed: Dec. 23, 2020

(86) PCT No.: PCT/KR2020/019006
§ 371 (c)(1),
(2) Date: Sep. 9, 2021

(87) PCT Pub. No.: WO2021/137519
PCT Pub. Date: Jul. 8, 2021

(65) Prior Publication Data
US 2022/0140429 A1    May 5, 2022

(30) Foreign Application Priority Data
Jan. 3, 2020   (KR) .................. 10-2020-0001003

(51) Int. Cl.
*H01M 50/258* (2021.01)
*H01M 50/211* (2021.01)
*H01M 50/505* (2021.01)

(52) U.S. Cl.
CPC ....... *H01M 50/258* (2021.01); *H01M 50/211* (2021.01); *H01M 50/505* (2021.01); *H01M 2220/20* (2013.01)

(58) Field of Classification Search
CPC ... H01M 50/502–505; H01M 2220/20; H01M 50/20–289; H01M 50/258; Y02E 60/10
See application file for complete search history.

(56) References Cited

U.S. PATENT DOCUMENTS 8,580,423 B2   11/2013   Kim
8,936,865 B2    1/2015   Kim
(Continued)

FOREIGN PATENT DOCUMENTS

CN   101517780 A   8/2009
CN   201655873 U  11/2010
(Continued)

OTHER PUBLICATIONS

Liu, CN 210074013 U, EPO machine translation, 2020 (Year: 2020).*

(Continued)

*Primary Examiner* — Jonathan G Leong
*Assistant Examiner* — Kan Luo
(74) *Attorney, Agent, or Firm* — Birch, Stewart, Kolasch & Birch, LLP

(57) ABSTRACT

Discussed is a battery module having an improved assembling property, and a battery pack including the same. The battery module includes a battery cell stack in which a plurality of battery cells are stacked; a frame to cover upper, lower, left, and right surfaces of the battery cell stack; a busbar frame to cover front and rear surfaces of the battery cell stack; and a support part which is formed by protruding from a lower end of the busbar frame, wherein a guide is formed in the support part, and the support part is inserted into an inside of the frame along the guide.

14 Claims, 11 Drawing Sheets

(56) References Cited

U.S. PATENT DOCUMENTS

| | | |
|---|---|---|
| 2010/0151299 A1 | 6/2010 | Ha et al. |
| 2011/0189537 A1 | 8/2011 | Wang |
| 2016/0036028 A1 | 2/2016 | Tsuruta et al. |
| 2018/0183119 A1 | 6/2018 | Ju et al. |
| 2019/0001838 A1 | 1/2019 | Choi et al. |
| 2019/0260099 A1 | 8/2019 | Ju et al. |
| 2019/0326569 A1 | 10/2019 | Chi et al. |
| 2019/0348720 A1 | 11/2019 | Oh et al. |
| 2019/0389318 A1 | 12/2019 | Lee et al. |
| 2020/0014005 A1 | 1/2020 | Lee et al. |
| 2020/0144580 A1 | 5/2020 | Hong et al. |
| 2020/0287182 A1 | 9/2020 | Kong et al. |
| 2020/0350645 A1 | 11/2020 | Ju et al. |
| 2020/0388814 A1 | 12/2020 | Jang et al. |
| 2020/0411924 A1 | 12/2020 | Yun |
| 2021/0126313 A1 | 4/2021 | Lee et al. |
| 2021/0194101 A1 | 6/2021 | Kim et al. |

FOREIGN PATENT DOCUMENTS

| | | | | |
|---|---|---|---|---|
| CN | 108242521 A | | 7/2018 | |
| CN | 108463902 A | | 8/2018 | |
| CN | 207901532 U | | 9/2018 | |
| CN | 110088939 A | | 8/2019 | |
| CN | 110506345 A | | 11/2019 | |
| CN | 210074013 U | * | 2/2020 | .............. H01M 2/26 |
| CN | 111066173 A | | 4/2020 | |
| EP | 2 894 695 A2 | | 7/2015 | |
| JP | 2000-135740 A | | 5/2000 | |
| JP | 2011-171114 A | | 9/2011 | |
| JP | 2013-243061 A | | 12/2013 | |
| JP | 6260487 B2 | | 1/2018 | |
| KR | 10-2011-0044130 A | | 4/2011 | |
| KR | 10-2014-0131715 A | | 11/2014 | |
| KR | 10-2015-0052755 A | | 5/2015 | |
| KR | 20180038253 A | * | 4/2018 | .............. H01M 2/10 |
| KR | 10-2018-0135701 A | | 12/2018 | |
| KR | 10-2019-0027096 A | | 3/2019 | |
| KR | 10-2019-0063109 A | | 6/2019 | |
| KR | 20200084450 A | * | 7/2020 | .............. H01M 2/10 |
| WO | WO2018/124494 A2 | | 7/2018 | |
| WO | WO2019/117514 A1 | | 6/2019 | |
| WO | WO2019/177275 A1 | | 9/2019 | |
| WO | WO2019/190072 A1 | | 10/2019 | |
| WO | WO2019/208938 A1 | | 10/2019 | |

OTHER PUBLICATIONS

Lee, KR 20200084450 A, EPO machine translation, 2020 (Year: 2020).*

Choi et al., KR 20180038253 A EPO machine translation, 2018 (Year: 2018).*

International Search Report for PCT/KR2020/019006 (PCT/ISA/210) mailed on Apr. 14, 2021.

Extended European Search Report for European Application No. 20910676.4, dated May 11, 2022.

* cited by examiner

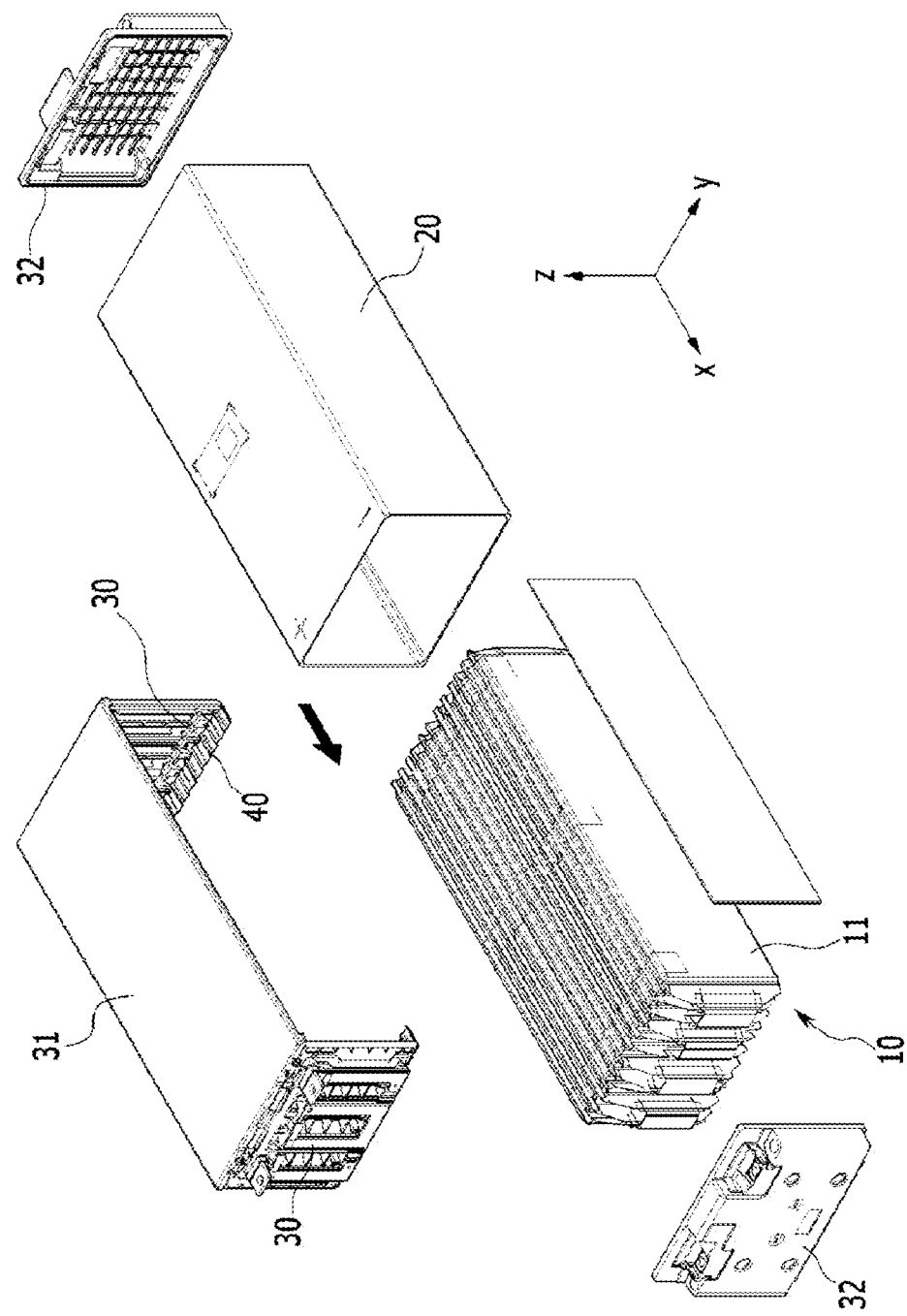
[FIG. 1]

[FIG. 2]
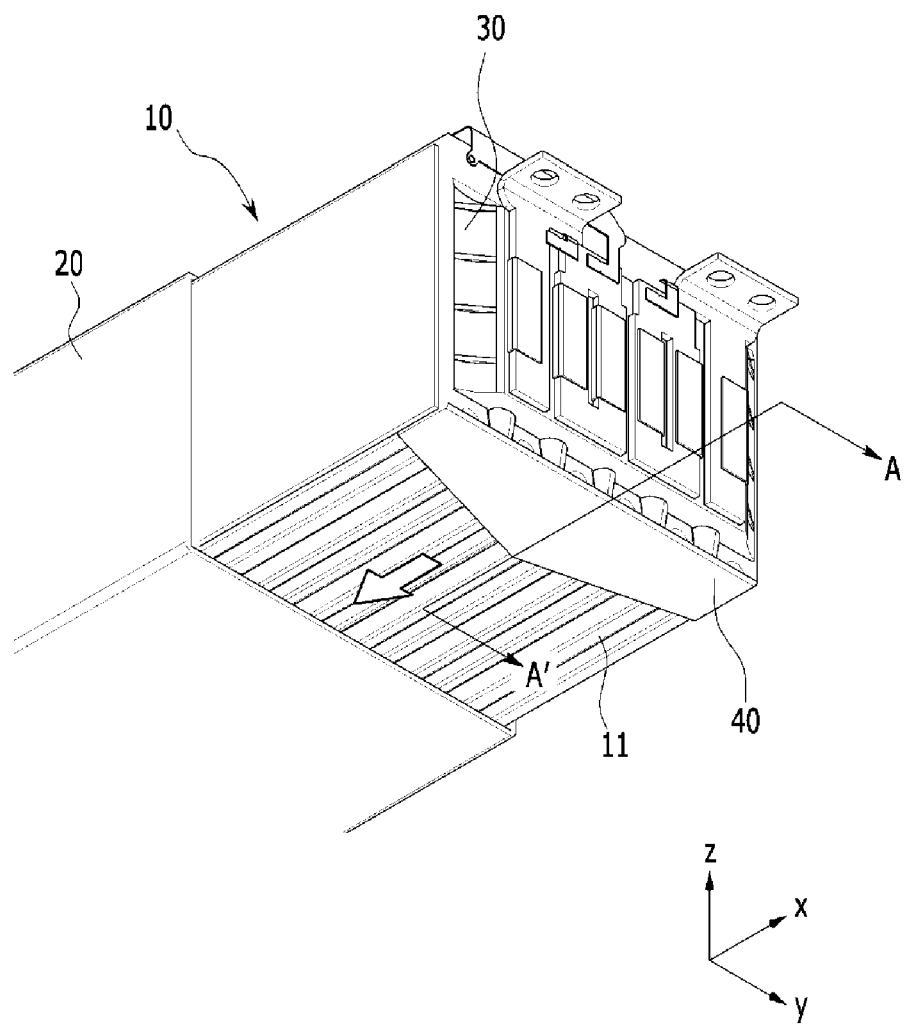

【FIG. 3】
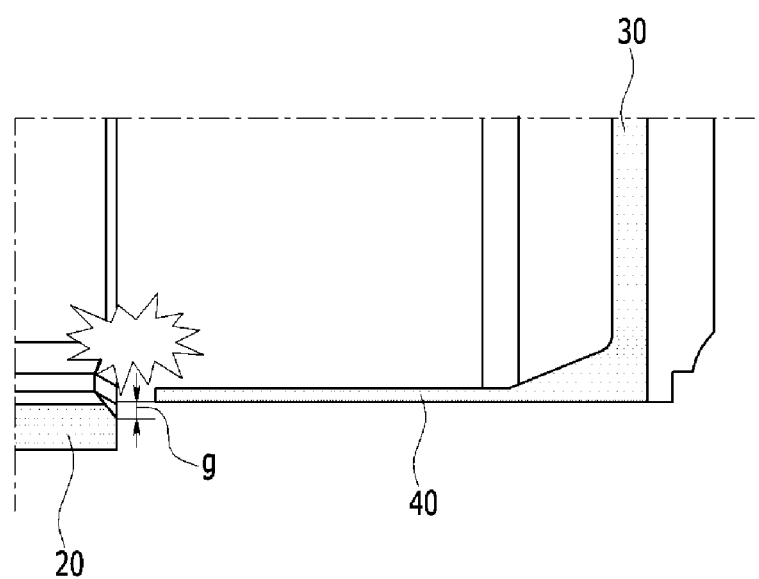

[FIG. 4]
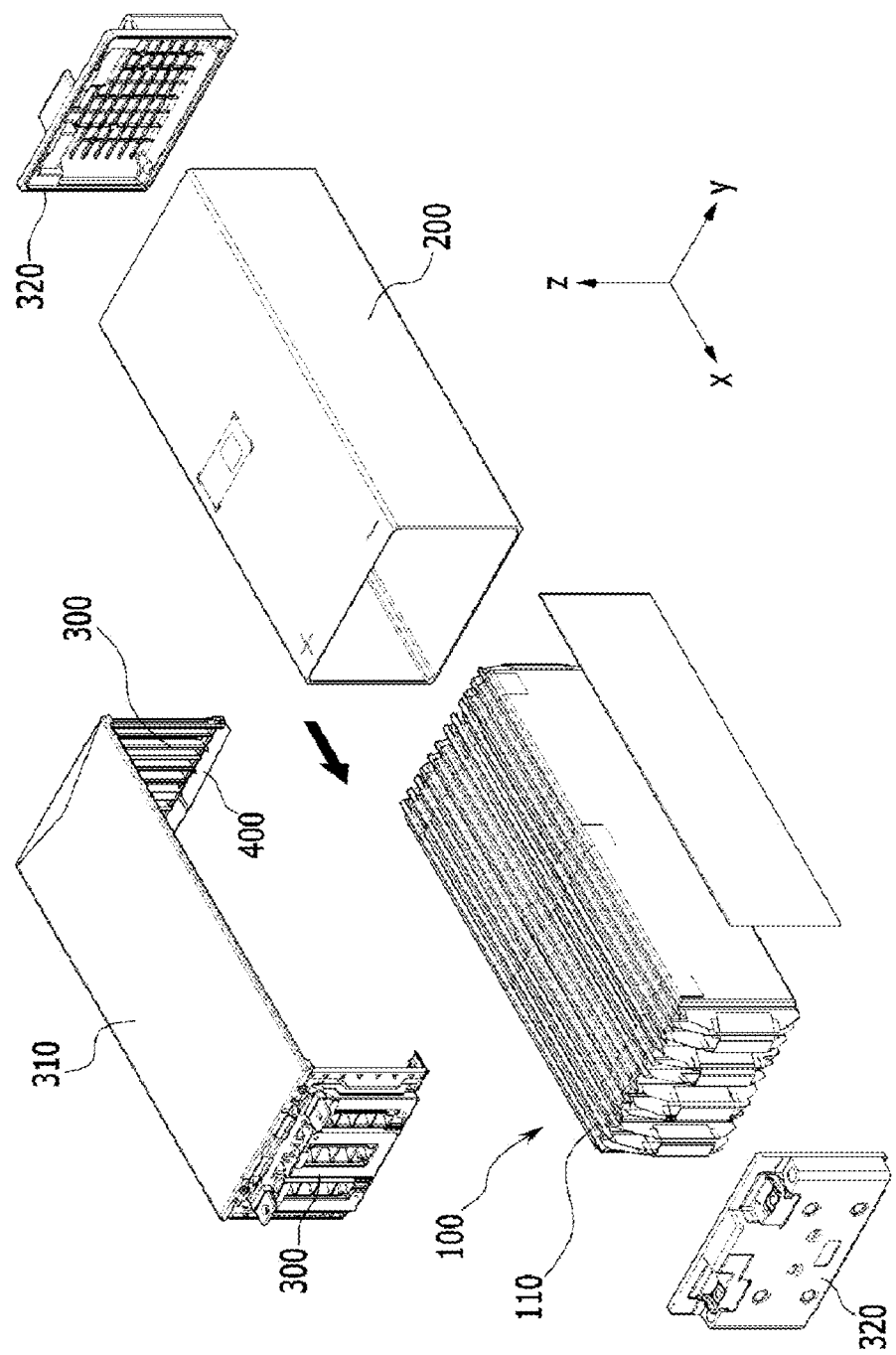

[FIG. 5]
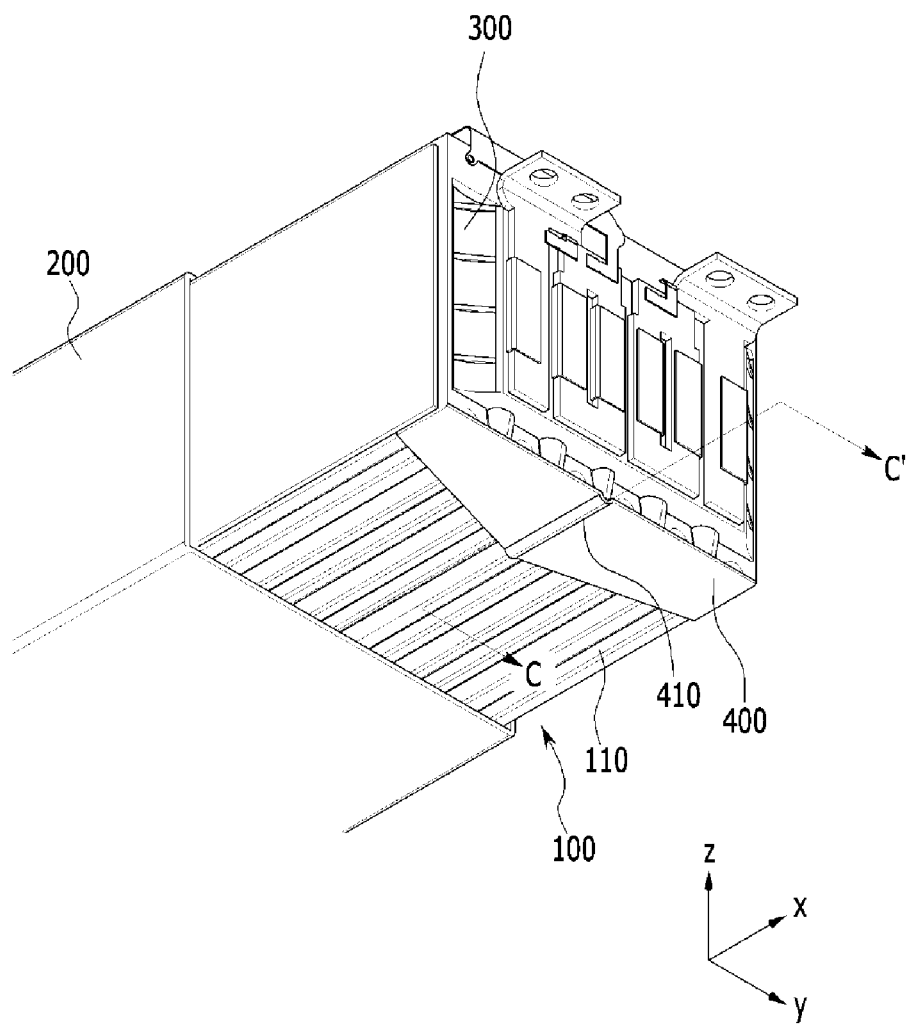

[FIG. 6]
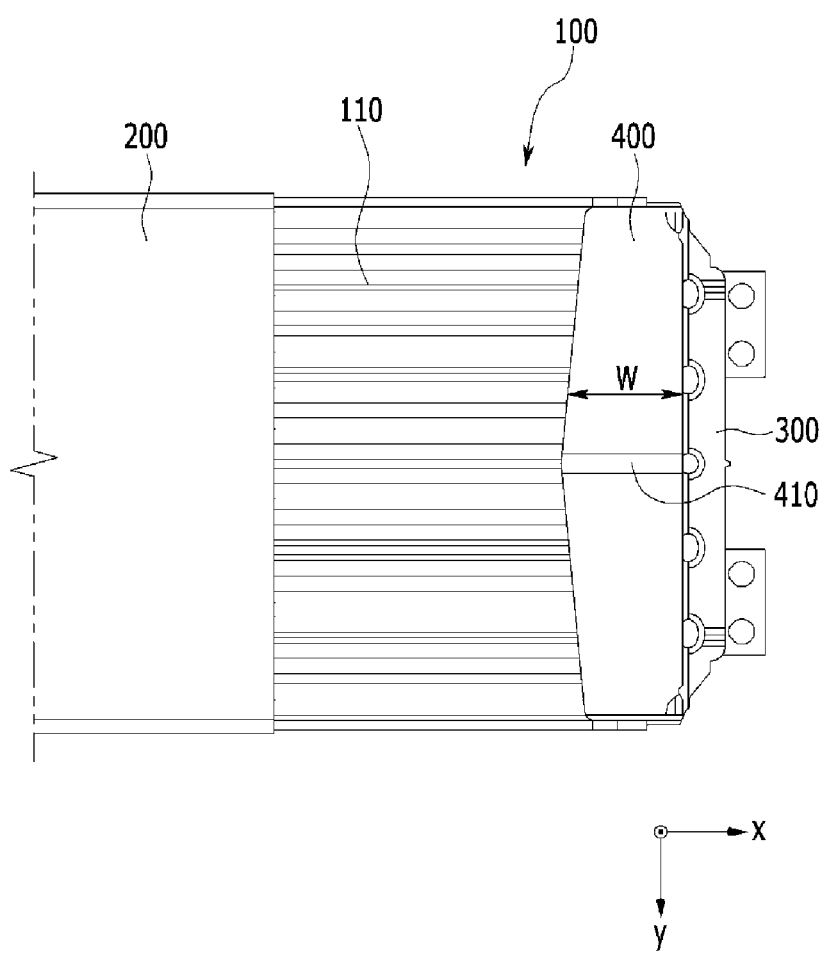

[FIG. 7]
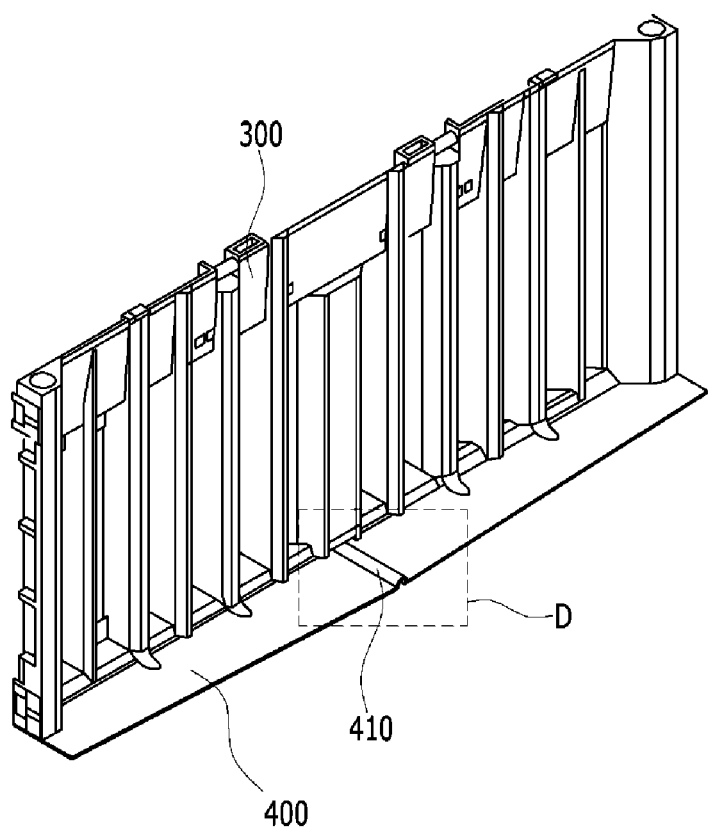

[FIG. 8]
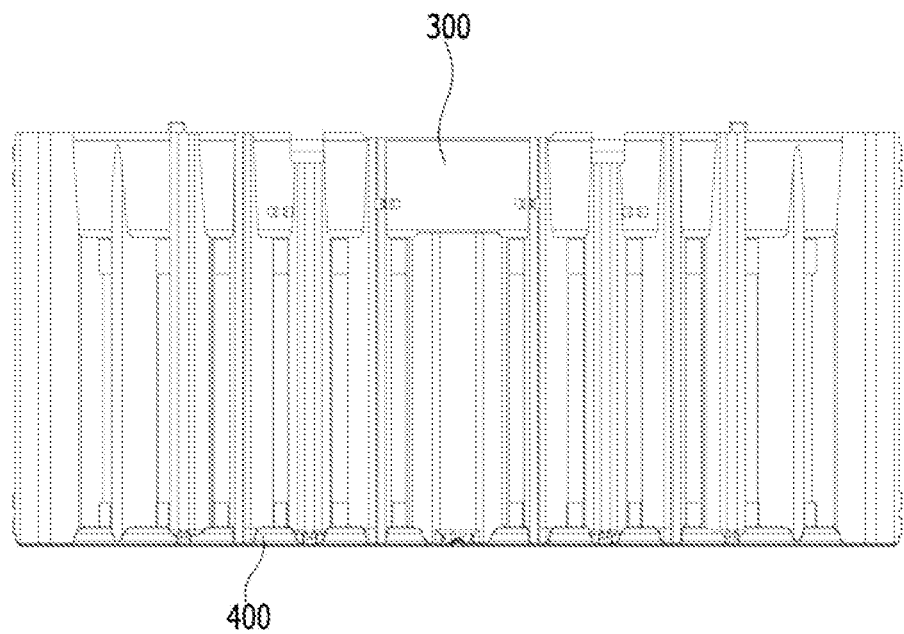

[FIG. 9]
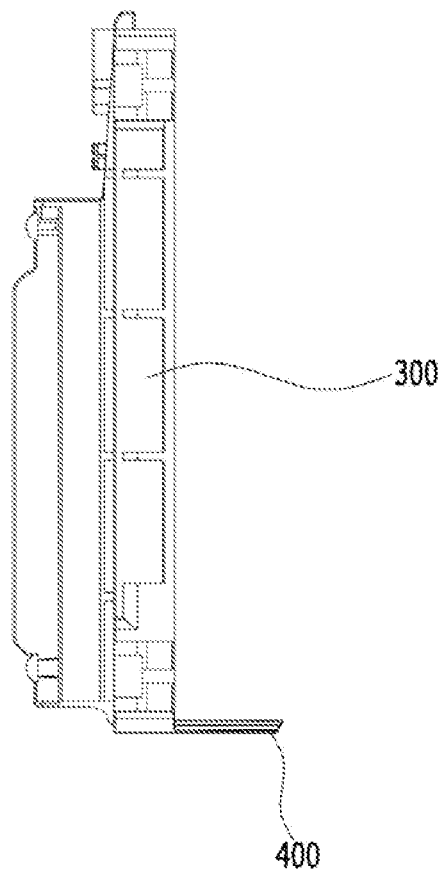
[FIG. 10]
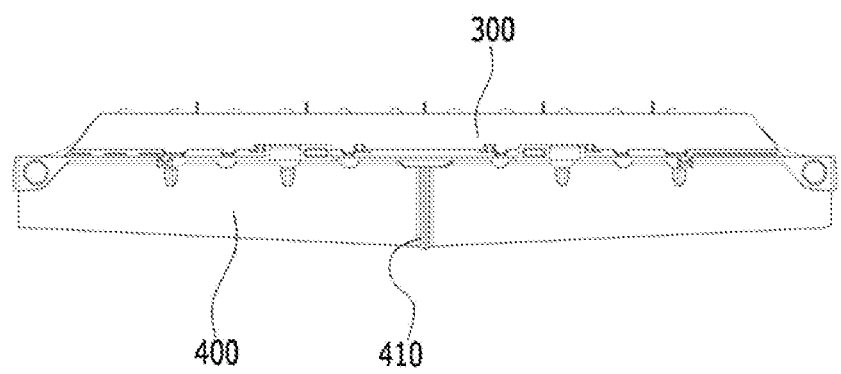

[FIG. 11]
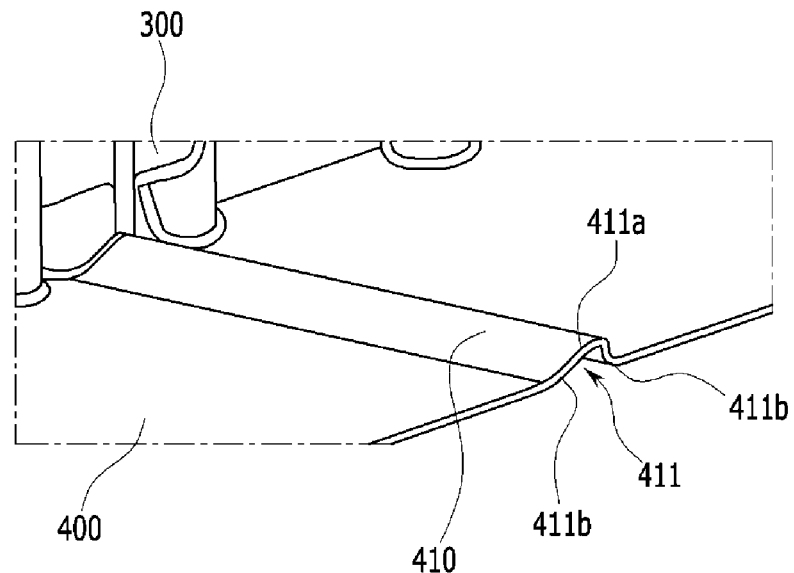
[FIG. 12]
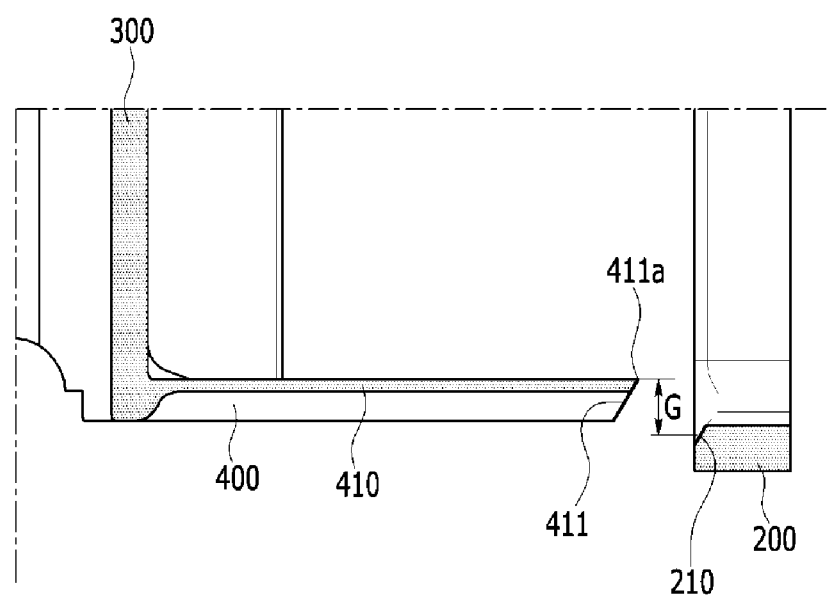

[FIG. 13]
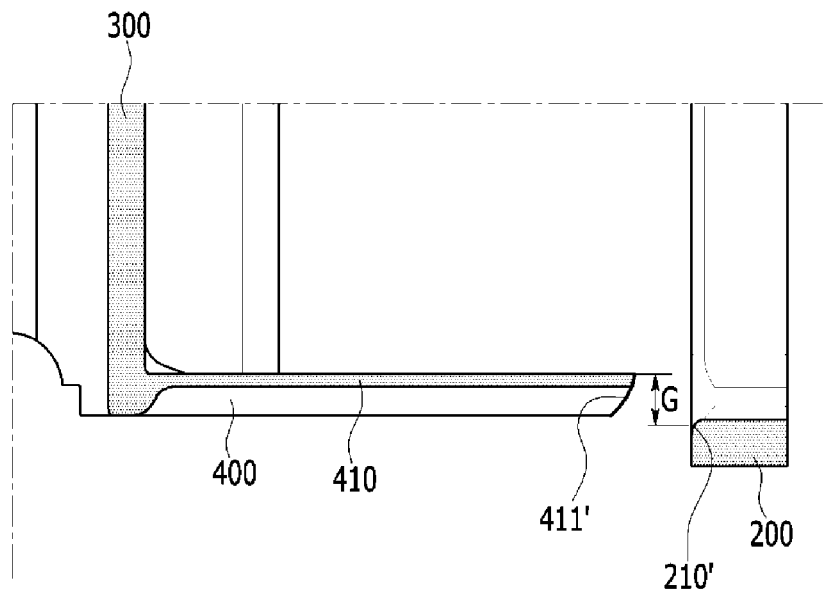
[FIG. 14]
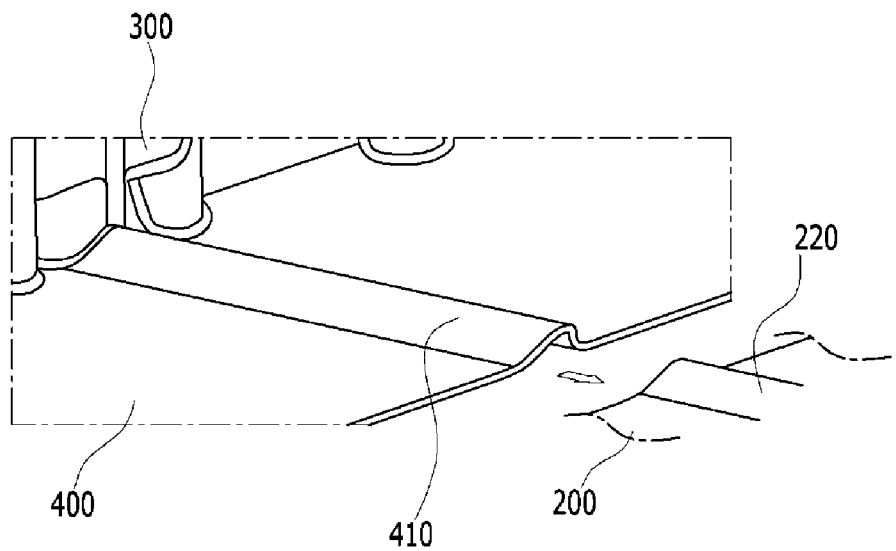

BATTERY MODULE AND BATTERY PACK INCLUDING THE SAME

CROSS CITATION WITH RELATED APPLICATION(S)

This application claims the benefit of Korean Patent Application No. 10-2020-0001003 filed on Jan. 3, 2020 with the Korean Intellectual Property Office, the disclosure of which is incorporated herein by reference in its entirety.

TECHNICAL FIELD

The present disclosure relates to a battery module and a battery pack including the same, and more particularly to a battery module having an improved assembling property, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell first, and then configure a battery pack by using at least one of the battery modules and adding other components.

Such a battery module may include a battery cell stack in which a plurality of battery cells are stacked, a frame for housing the battery cell stack, and a busbar frame for covering the battery cell stack.

FIG. 1 is an exploded perspective view of a conventional battery module.

Referring to FIG. 1, the conventional battery module includes a battery cell stack 10 in which a plurality of battery cells 11 are stacked, a frame 20 for housing the battery cell stack 10, a busbar frame 30 for covering the front and rear surfaces of the battery cell stack 10, an upper plate 31 in which the busbar frame 30 formed on both sides of the battery cell stack 10 is connected at the upper side of the battery cell stack 10, and an end plate 32 for covering the front and rear surfaces of the battery cell stack 10 and the busbar frame 30 formed on the front and rear surfaces of the battery cell stack 10, wherein a protrusion part 40 is formed at the lower end of the busbar frame 30 to be inserted into a space between the lower surface of the frame 20 and the lower surface of the battery cell stack 10.

In order to form such a battery module, it is necessary to horizontally assembly such that the battery cell stack 10 is inserted into the opened front or rear surfaces of the mono frame 20 along the X-axis direction as shown by the arrow in FIG. 1. However, in order to stably perform such a horizontal assembly, a sufficient clearance must be secured between the battery cell stack 10 and the frame 20.

More specifically, the protrusion part 40 formed at the lower end of the busbar frame 30 should be designed so that it can be inserted through a sufficient clearance formed in the space between the lower surface of the frame 20 and the lower surface of the battery cell stack 10. When the tolerance is small, collisions occur between the protrusion part 40 and the lower surface of the frame 20 in the horizontal assembly process of the battery cell stack 10, so that a damage may occur on the busbar frame 30 or the protrusion part 40 coupled to the busbar frame 30.

DETAILED DESCRIPTION OF THE INVENTION

Technical Problem

It is an object of the present disclosure to provide a battery module having an improved assembling property, and a battery pack including the same.

However, the problem to be solved by embodiments of the present disclosure is not limited to the above-described problems, and can be variously expanded within the scope of the technical idea included in the present disclosure.

Technical Solution

In order to achieve the above object, the battery module according to one embodiment of the present disclosure includes a battery cell stack in which a plurality of battery cells are stacked; a frame for covering the upper, lower, left, and right surfaces of the battery cell stack; a busbar frame for covering the front and rear surfaces of the battery cell stack; and a support part which is formed by protruding from the lower end of the busbar frame, wherein a guide is formed in the support part, and the support part is inserted into the inside of the frame along the guide.

The guide may be formed extendedly from a part connected to the busbar frame to an end part of the support part.

The guide may be formed in a direction in which the busbar frame is inserted into the inside of the frame.

The guide may be formed so as to become convex upward.

A chamfered part may be formed at the end part of the guide.

The chamfered part may be formed so as to be cut in a diagonal direction so that the upper end protrudes more than the lower end.

A chamfer counterpart, which are formed to be cut in a diagonal direction so as to correspond to the chamfered part, may be formed at the center of both ends of the lower surface of the frame.

A guide protrusion part, which is formed so as to correspond to the guide, may be formed on the lower surface of the frame, and when the support part is inserted into the inside of the frame, the guide may be inserted along the guide protrusion part in a state of being assembled with the guide protrusion part.

The support part may be formed flat, and may be inserted into a space formed between the lower surface of the battery cell stack and the lower surface of the frame at the lower end of the busbar frame.

A protrusion width of the support part may be increased as it goes to the center.

Advantageous Effects

A battery module and a battery pack including the same according to one embodiment of the present disclosure provide the effect of maximally preventing damage to the support part and busbar frame due to interference between the frame and the support part, and strengthening the rigidity of the support part structure itself.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view showing a conventional battery module.

FIG. 2 is a perspective view showing a battery module according to a comparative example of the present disclosure.

FIG. 3 is a cross-sectional view showing the part A-A' in FIG. 2.

FIG. 4 is a perspective view showing a battery module according to one embodiment of the present disclosure.

FIG. 5 is a diagram showing a state in which the battery cell stack and the busbar frame shown in FIG. 4 are assembled to the frame.

FIG. 6 is a diagram showing a bottom view in FIG. 5.

FIG. 7 is a perspective view showing a busbar frame and a support part according to one embodiment of the present disclosure.

FIG. 8 is a front view of a busbar frame and a support part according to one embodiment of the present disclosure.

FIG. 9 is a side view of a busbar frame and a support part according to one embodiment of the present disclosure.

FIG. 10 is a bottom view of a busbar frame and a support part according to one embodiment of the present disclosure.

FIG. 11 is an enlarged view of a part D of FIG. 7 as a battery module in which a chamfered part is formed according to a modified embodiment of the present disclosure.

FIG. 12 is a view showing the part C-C' in FIG. 5 as a battery module in which a chamfered part is formed according to a modified embodiment of the present disclosure.

FIG. 13 is a view showing a state in which a shape of the chamfered part shown in FIG. 12 is deformed.

FIG. 14 is a view showing a state in which a battery module having a guide protrusion part formed thereon is assembled according to a modified embodiment of the present disclosure.

DETAILED DESCRIPTION OF THE EMBODIMENTS

It should be appreciated that the embodiments, which will be described below, are illustratively described to help understand the present disclosure, and the present disclosure may be variously modified and carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

The terms such as first, second, and the like may be used to describe various components and the components should not be limited by these terms. The terms are used simply to distinguish one constituent element from another component.

The terms used herein are used only to describe specific embodiments, and are not intended to limit the scope of the present disclosure. A singular form may include a plural form if there is no clearly opposite meaning in the context. In this disclosure, terms such as "include", "comprises" and "have" should be understood as designating as including such features, numbers, operations, elements, components or a combination thereof in the disclosure, and not to exclude the existence or possibility of adding one or more of other features, numbers, operations, elements, components or a combination thereof.

Hereinafter, a busbar frame and a support part according to a comparative example of the present disclosure will be described with reference to FIGS. 2 and 3.

FIG. 2 is a perspective view showing a battery module according to a comparative example of the present disclosure. FIG. 3 is a cross-sectional view showing the part A-A' in FIG. 2.

Referring to FIGS. 2 and 3, the battery module according to a comparative example of the present disclosure includes a battery cell stack 10 in which a plurality of battery cells 11 are stacked, a frame 20 formed in the upper, lower, left and right surfaces to house the upper, lower, left, and right surfaces of the battery cell stack 10, a busbar frame 30 for covering the front and rear surfaces of the battery cell stack 10, and a support part 40 which is formed by protruding from the lower end of the busbar frame 30.

In this case, the support part 40 is formed flat, and as shown in FIG. 2, the support part 40 may be inserted into the inside of the frame 20 in the direction of the arrow shown in FIG. 2 in a state of being assembled in the lower surface of the battery cell stack 10 together with the busbar frame 30.

However, as shown in FIG. 3, when the support part 40 is inserted into the inside of the frame 20, interference occurs between the lower surface of the frame 20 and the support part 40, and thus, the support part 40 or the busbar frame 30 may be damaged during this insertion process. Specifically, the support part 40 is formed in a flat shape and may be bent during the insertion process, and some fragments are formed so as to be placed inside the battery module, thereby causing deterioration of performance of the battery module. In addition, there is a concern that the busbar frame 30 coupled to the support part 40 is damaged, resulting in a deterioration of the function of the battery module.

Hereinafter, a battery module in which a guide is formed in a support part according to one embodiment of the present disclosure will be described with reference to FIGS. 4 to 10.

FIG. 4 is a perspective view showing a battery module according to one embodiment of the present disclosure. FIG. 5 is a diagram showing a state in which the battery cell stack and the busbar frame shown in FIG. 4 are assembled to the frame. FIG. 6 is a diagram showing a bottom view in FIG. 5. FIG. 7 is a perspective view showing a busbar frame and a support part according to one embodiment of the present disclosure. FIG. 8 is a front view of a busbar frame and a support part according to one embodiment of the present disclosure. FIG. 9 is a side view of a busbar frame and a support part according to one embodiment of the present disclosure. FIG. 10 is a bottom view of a busbar frame and a support part according to one embodiment of the present disclosure.

Referring to FIGS. 4 to 10, the battery module according to one embodiment of the present disclosure includes: a battery cell stack 100 in which a plurality of battery cells 110 are stacked, a frame 200 for covering the upper, lower, left, and right surfaces of the battery cell stack 100, a busbar frame 300 for covering the front and rear surfaces of the battery cell stack 100, and a support part 400 which is formed by protruding from the lower end of the busbar frame 300, wherein a guide 410 is formed in the support part 400, and the support part 400 is inserted into the inside of the frame 200 along the guide 410.

The battery cell 110 is a secondary battery and may be configured as a pouch-type secondary battery. These battery cells 110 may be composed of a plurality of cells, and the plurality of battery cells 110 may be stacked with each other so as to be electrically connected to each other, thereby forming a battery cell stack 100. Each of the plurality of battery cells may include an electrode assembly, a battery case, and an electrode lead protruding from the electrode assembly.

The frame 200 can be formed at the upper, lower, left, and right surfaces, and may be formed so as to cover the upper, lower, left, and right surfaces of the battery cell stack 100. The battery cell stack 100 may be physically protected through the frame 200.

The busbar frame 300 is formed on the front and rear surfaces of the battery cell stack 100 to cover the battery cell stack 100 and also guide the connection between the battery cell stack 100 and an external power source.

The upper plate 310 may be configured such that busbar frames 300, which are respectively formed on the front and rear surfaces of the battery cell stack 100, can be connected to the upper side of the battery cell stack 100. A flexible circuit board can be formed on the upper plate 310 to electrically connect the front and rear surfaces of the busbar frames 300.

The end plate 320 may be formed on the front and rear sides of the battery cell stack 100 so as to cover the battery cell stack 100 and the busbar frame 300 formed on the front and rear surfaces of the battery cell stack 100. The end plate 320 can be joined to the frame 200 via welding, thereby maximally blocking the connection between the battery cell stack 100 and the outside, and at the same time, protecting the busbar frame 300 and several electrical components connected thereto from external physical forces, and can include a battery module mounting structure to be mounted on the battery pack.

The support part 400 is formed integrally with the busbar frame 300 and can be protruded and formed on the lower end of the busbar frame 300 so as to be perpendicular to the frame surface of the busbar frame 300. The support part 400 may be formed flat, and thereby, it may be inserted into a horizontal space formed between the lower surface of the battery cell stack 100 and the lower surface of the frame 200 at the lower end of the busbar frame 300.

Referring to FIG. 6, a protrusion width (W) of the support part 400 is increased as it goes to the center. Therefore, the protrusion width (W) of the support part 400 may be formed to be the longest in the center of the support part 400, and due to the V-shape having the longest protrusion width W in the central part in this way, the assembling property can be improved when the busbar frame 300 and the support part 400 are inserted into the frame 200. More specifically, since it is inserted into the frame 200 from the V-shaped pointed part, damage to the busbar frame 300 and the support part 400 may be minimized during the insertion process. In contrast, assuming a structure in which the support parts all have the same protrusion width, when the support part is inserted into the frame, it is more likely that both ends of the support part get caught on both sides of the frame, and as a result, the assembling property can be reduced as compared with the V-shape according to the embodiment of the present disclosure.

The guide 410 is formed in the center of the support part 400, and the support part 400 is inserted into the inside of the frame 200 along the guide 410. Compared with the comparative examples shown in FIGS. 2 and 3, in one embodiment of the present disclosure, a guide can be formed on the support part 400, thereby strengthening the rigidity of the support part 400 itself. The busbar frame 300 and the support part 400 are inserted into the inside of the frame in the direction in which the guide 410 is formed, so that interference between the support part and the lower surface of the frame can be minimized.

According to one embodiment of the present disclosure, the guide 410 may be formed extendedly from the part connected to the busbar frame 300 to the end part of the support part 400. In addition, the guide 410 may be formed such that a direction in which the busbar frame 300 is inserted into the inside of the frame 200 is a longitudinal direction. The guide 410 may be formed to become convex upward. The lower side of the guide 410 may be provided with a guide space formed to be concave, such as a chamfered part.

Hereinafter, a battery module in which a chambered part is formed according to a modified embodiment of the present disclosure will be described with reference to FIGS. 11 to 13.

FIG. 11 is an enlarged view of a part D of FIG. 7 as a battery module in which a chamfered part is formed according to a modified embodiment of the present disclosure. FIG. 12 is a view showing the part C-C' in FIG. 5 as a battery module in which a chamfered part is formed according to a modified embodiment of the present disclosure. FIG. 13 is a view showing a state in which a shape of the chamfered part shown in FIG. 12 is deformed.

Referring to FIGS. 11 to 13, the battery module according to the modified embodiment of the present disclosure may be configured such that the chamfered part 411 is formed at the end of the guide 410. At this time, the chamfered part 411 may be formed to be cut in a diagonal direction so that the upper end of the chamfered part 411 protrudes more than the lower end. In addition, a chamfer counterpart 210, which is formed to be cut in a diagonal direction so as to correspond to the chamfered part 411, may be formed at the center of both ends of the lower surface of the frame 200.

By forming the chamfered part 411 having a cutting structure at the end of the guide 410, when assembling the busbar frame 300 and the support part 400, the support part 400 may be more naturally inserted into the inside of the frame 200 due to the inclination of the chamfered part 411. Further, through the chamfer counterpart 210 which is formed to correspond to the chamfered part 411 at the center of both ends of the lower surface of the frame 200, the guide 410 and the support part 400 on which the chamfered part 411 is formed may be inserted into the inside of the frame 200 more smoothly by using the inclined surface of the chamfer counterpart 210.

Further, since the upper end 411a of the chamfered part formed at the end part of the guide 410, which is formed so that the most protruding part of the support part is formed to become convex upward, when the support part 400 is inserted into the inside of the frame 200, a sufficient gap G is secured between the upper end 411a of the chamfer part and the lower end of the frame 200 that can be seen by clearance. When the support part 400 and the frame 200 are used, collisions between corners can be maximally prevented.

In contrast, in the comparative examples shown in FIGS. 2 and 3, the distance (g) between the support part 40 on which the guide is not formed and the lower surface of the frame 20 may be formed to be smaller than the support part insertion interval G according to one embodiment of the present disclosure. According to the comparative example, the distance (g) between the support part 40 and the lower surface of the frame 20 is formed to be about 0.7 mm at the maximum, whereas the support part insertion interval (G) according to the embodiments of the present disclosure may be formed to a maximum of about 2.2 mm.

Referring to FIG. 13, the shape of the chamfered part 411' may be bluntly formed. Further, the shape of the chamfer counterpart 210' corresponding to the chamfered part 411' may also be formed bluntly. This minimizes the contact area between the chamfered part 411' and the chamfer counterpart 210', thereby minimizing a friction force according to the contact surface. The support part 400 including the chamfered part 411' may be more easily inserted into the inside of the frame 200.

Hereinafter, a battery module having a guide protrusion part according to a modified embodiment of the present disclosure will be described with reference to FIG. 14.

FIG. 14 is a view showing a state in which a battery module having a guide protrusion part formed thereon is assembled according to a modified embodiment of the present disclosure.

Referring to FIG. 14, the battery module according to a modified embodiment of the present invention may be configured such that a guide protrusion part 220 formed to correspond to the guide 410 is formed on the lower surface of the frame 200, and when the support part 400 is inserted into the inside of the frame 200, the guide 410 may be inserted along the guide protrusion part 220 in a state of being assembled with the guide protrusion part 220.

The guide 410 according to one embodiment of the present disclosure may be formed to be convex on the upper side and relatively a concave-shaped guide space may be formed on the lower side. The guide protrusion part 220 is formed in a shape corresponding to the guide space, and the guide 410 is assembled to the guide protrusion part 220 and is formed so as to be slidably inserted into the inside of the frame 200 along the guide protrusion part 220.

The guide 410 can be inserted into the inside of the frame 200 in the correct direction via the guide protrusion part 220, and thereby, the support part 400 and the busbar frame 300 are mounted in the correct position without being damaged, so that secondary damage due to component damage that may occur during assembly of the battery module can be prevented in advance.

Meanwhile, one or more battery modules according to the embodiment of the present disclosure can be packaged in a pack case to form a battery pack. The battery pack may have a structure in which one or more of the battery modules according to the present embodiment are gathered, and packed together with a battery management system (BMS) and a cooling device that control and manage battery's temperature, voltage, etc.

The above-mentioned battery module and the battery pack including the same can be applied to various devices. These devices may be applied to transportation means such as an electric bicycle, an electric vehicle, a hybrid vehicle, but the present disclosure is not limited thereto and can be applied to various devices that can use the battery module or the battery pack including the same.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery cell stack
110: battery cell
200: frame
210: chamfer counterpart
220: guide protrusion part
300: busbar frame
310: upper plate
320: end plate
400: support part
410: guide
411: chamfered part
411a: upper end of the chamfered part
411b: lower end of the chamfered part
G: support part insertion interval
W: protrusion width

The invention claimed is:

1. A battery module comprising:
a battery cell stack in which a plurality of battery cells are stacked;
a frame configured to cover upper, lower, left, and right surfaces of the battery cell stack;
a busbar frame configured to cover front and rear surfaces of the battery cell stack; and
a support part which is formed by protruding from a lower end of the busbar frame,
wherein a guide is formed in the support part, and the support part is inserted into an inside of the frame along the guide, and
wherein a chamfered part is formed at an end part of the guide.

2. The battery module of claim 1, wherein the guide is formed extendedly from a part connected to the busbar frame to an end part of the support part.

3. The battery module of claim 2, wherein the guide is formed in a direction in which the busbar frame is inserted into the inside of the frame.

4. The battery module of claim 1, wherein the guide is formed to convex upward as a whole.

5. The battery module of claim 1, wherein the chamfered part is formed cut in a diagonal direction so that an upper end protrudes more than a lower end.

6. The battery module of claim 5, wherein a chamfer counterpart, which are formed cut in a diagonal direction to correspond to the chamfered part, is formed at a center of both ends of a lower surface of the frame.

7. The battery module of claim 1, wherein a guide protrusion part, which is formed to correspond to the guide, is formed on a lower surface of the frame, and
when the support part is inserted into the inside of the frame, the guide is inserted along the guide protrusion part in a state of being assembled with the guide protrusion part.

8. The battery module of claim 1, wherein the support part is formed flat, and is inserted into a space formed between the lower surface of the battery cell stack and a lower surface of the frame at the lower end of the busbar frame.

9. The battery module of claim 8, wherein a protrusion width of the support part is increased as it goes to the center thereof.

10. The battery module of claim 8, wherein a length of the guide is the same as a protrusion width of the support part.

11. A battery pack comprising the battery module according to claim 1.

12. The battery module of claim 1, wherein the guide extends parallel to the support part.

13. The battery module of claim 1, wherein the guide includes a convex surface at a first side of the support part and includes a concave surface at a second side of the support part that is opposite to the first side.

14. A battery module comprising:
- a battery cell stack in which a plurality of battery cells are stacked;
- a frame configured to cover upper, lower, left, and right surfaces of the battery cell stack;
- a busbar frame configured to cover front and rear surfaces of the battery cell stack; and
- a support part which is formed by protruding from a lower end of the busbar frame,
- wherein a guide is formed in the support part, and the support part is inserted into an inside of the frame along the guide,
- wherein the guide is formed to convex upward, and
- wherein a chamfered part is formed at an end part of the guide.

* * * * *